(12) United States Patent
Xu (10) Patent No.: US 8,086,606 B1
(45) Date of Patent: Dec. 27, 2011

(54) PERFORMING A KEYWORD SEARCH BASED ON IDENTIFYING EXCLUSIVE LOWEST COMMON ANCESTOR (ELCA) NODES

(75) Inventor: Yu Xu, San Diego, CA (US)

(73) Assignee: Teradata US, Inc., Dayton, OH (US)

(*) Notice: Subject to any disclaimer, the term of this patent is extended or adjusted under 35 U.S.C. 154(b) by 586 days.

(21) Appl. No.: 12/173,270

(22) Filed: Jul. 15, 2008

(51) Int. Cl.
*G06F 17/30* (2006.01)
*G06F 7/24* (2006.01)
(52) U.S. Cl. ........................ 707/736; 707/770
(58) Field of Classification Search .................. 707/602, 707/736, 770
See application file for complete search history.

(56) References Cited

U.S. PATENT DOCUMENTS

| 7,454,415 B1* | 11/2008 | Bruno et al. ........................ 1/1 |
| 2002/0075327 A1* | 6/2002 | Stall .............................. 345/853 |
| 2003/0204513 A1* | 10/2003 | Bumbulis ....................... 707/100 |
| 2006/0200811 A1* | 9/2006 | Cheng ........................... 717/144 |
| 2008/0215559 A1* | 9/2008 | Fontoura et al. ................... 707/4 |
| 2008/0281834 A1* | 11/2008 | Wu et al. ....................... 707/100 |
| 2009/0030921 A1* | 1/2009 | Kadiyska et al. ............. 707/101 |
| 2010/0083095 A1* | 4/2010 | Nikovski et al. .............. 715/234 |

OTHER PUBLICATIONS

S. Agrawal et al., "DBXplorer: A System for Keyword-Based Search over Relational Databases," IEEE Proc. of the 18th Int'l. Conf. on Data Engineering (ICDE '02), 12 pages (2002).

S. Amer-Yahia et al., "TeXQuery: A Full-Text Search Extension to XQuery," published in WWW 2004, 12 pages (May 17-22, 2004).

G. Bhalotia et al., "Keyword Searching and Browsing in Databases using BANKS," published in ICDE 2002, 10 pages (2002).

S. Cohen et al., "XSEarch: A Semantic Search Engine for XML," published in VLDB 2003, 12 pages, 2003.

D. Florescu et al., "Integrating Keyword Search into XML Query Processing," published in WWW9, 2000, 17 pages (2000).

N. Fuhr et al., "XIRQL: A Query Language for Information Retrieval in XML Documents," published in SIGIR '01, 9 pages (Sep. 9-12, 2001).

R. Goldman et al., "Proximity Search in Databases," published in proceedings of the 24th VLDB Conf., 12 pages (1998).

L. Guo et al., "XRANK: Ranked Keyword Search over XML Documents," published in SIGMOD 2003, 12 pages (Jun. 9-12, 2003).

V. Hristidis et al., "Discover: Keyword Search in Relational Databases," published in the 28th VLDB Conf. 2002, 12 pages (2002).

V. Hristidis et al., "Keyword Proximity Search on XML Graphs," published in ICDE 2003, 12 pages (2003).

V. Kacholia et al., "Bidirectional Expansion for Keyword Search on Graph Databases," published in Proc. of the 31st VLDB Conf. 2005, pp. 505-516 (2005).

(Continued)

*Primary Examiner* — James Trujillo
*Assistant Examiner* — Soheila Davanlou
(74) *Attorney, Agent, or Firm* — Trop, Pruner & Hu P.C (57) ABSTRACT

A hierarchical arrangement of nodes is provided to represent Extensible Markup Language (XML) data. In response to a keyword search query containing query keywords, sets of nodes in the hierarchical arrangement are identified for respective query keywords. A smallest of the sets of nodes is identified, and starting with the smallest of the sets of nodes, a stack-based algorithm is applied to identify exclusive lowest common ancestor (ELCA) nodes of the hierarchical arrangement.

13 Claims, 8 Drawing Sheets

OTHER PUBLICATIONS

Y. Li et al., "Schema-Free XQuery," published in the Proc. of the 30th VLDB Conf. 2004, pp. 72-83 (2004).

Z. Liu et al., "Identifying Meaningful Return Information for XML Keyword Search," published in SIGMOD '07, 12 pages (Jun. 11-14, 2007).

D. Quass et al., "Querying Semistructured Heterogeneous Information," published in Deductive and Object-Oriented Database, pp. 319-344 (1995).

A.R. Schmidt et al., "The Benchmark Project," http://monetdb.cwi.nl/xml, pp. 1-17 (Apr. 30, 2001).

A. Schmidt et al., "Querying XML Documents Made Easy: Nearest Concept Queries," published in ICDE 2001, 9 pages (2001).

C. Sun et al., "Multiway SLCA-based Keyword Search in XML Data," published in WWW 2007, pp. 1043-1052 (May 8-12, 2007).

A. Theobald et al., "Adding Relevance to XML," published in WebDB 2000, LNCS 1997, pp. 105-124 (2001).

A. Theobald et al., "The Index-Based XXL Search Engine for Querying XML Data with Relevance Ranking," published in EDBT 2000, LNCS 2287, pp. 477-498 (2002).

Y. Xu et al., "Efficient Keyword Search for Smallest LCAs in XML Databases," published in SIGMOD 2005, 12 pages (Jun. 12-16, 2005).

Y. Xu et al., "Efficient LCA based Keyword Search in XML Data," published in CIKM '07, 4 pages (Nov. 6-8, 2007).

* cited by examiner

```
isELCA(v, ch){
(* return true if v is an ELCA node, ch=child_elcacan (v) *)

1   for 1 ≤ i ≤ k {
2       x=v
3       for 1 ≤ j ≤ |ch| {
4           x = rm(x, S_i) (* x is a witness node for v in S_i*)
5           if( pre(x) < pre(ch[j]) ) break;
6           else {
// The function sibling(u) returns the immediate right
//sibling node of u among the list of child nodes of v.
7               x=sibling(ch[j])
8           }
9       }
10      if (j==|ch| + 1) {
11          x = rm(sibling(ch[|ch|]), S_i)
12          if(v ≺_α x) return false;
13      }
14  return true;
```

FIG. 5

```
1   Stack = empty
2   for each node $v_1$ in $S_1$ {
3     (* elca_can$_{v1}$ :the ELCA_CAN of $v_1$; *)
4     elca_can$_{v1}$ = elca_can($v_1$)
5       (* create a Stack entry stackEntry for elca_can$_{v1}$ *)
6     stackEntry = [elca_can$_{v1}$ = elca_can$_{v1}$ ; SIB = []; CH = []]
7     if (Stack.isEmpty()) Stack.push(stackEntry)
8     else (
9       topEntry = Stack.top()
10      elca_can$_{v2}$ = topEntry.elca_can
11      if(pre(elca_can$_{v2}$) == pre(elca_can$_{v1}$)) {} (* Figure 7(a) *)
12      else if (elca_can$_{v2}$) $\prec_\alpha$ (elca_can$_{v1}$)
            Stack.push(stackEntry)(* Figure 7(b) *)
13      else if (elca_can$_{v2}$ > pre(elca_can$_{v1}$)){ (* Figure 7(c) *)
14        popEntry = popStack(elca_can$_{v1}$)
15        top_elcacan = Stack.top().elca_can
16        potential_elcacan = lca(elca_can$_{v1}$, popEntry.elca_can)
17        If(!Stack.isEmpty() && top_elcacan $\prec_\alpha$ potential_elcacan)
18          stackEntry.SIB = [popEntry.SIB,popEntry.elca_can]
19        Stack.push(stackEntry)
20      }
21      else if (elca_can$_{v1}$ $\prec_\alpha$ elca_can$_{v2}$) { (* Figure 7(d) *)
22        popEntry = popStack(elca_can$_{v1}$)
23        stackEntry.CH=[popEntry.SIB., popEntry.elca_can)
24        Stack. push(stackEntry)
25      }
26   }
27 } (* end of for loop*)
28 popStack(0) (* clean up the stack *)

29 popStack(elca_can$_{v1}$) : StackEntry
   (* pop out all top entries of the stack whose nodes are not
   ancestors of elca_can$_{v1}$ *)
30  popEntry=null;
31  while(Stack.top() !=NULL
        && Stack.top().elca_can $\not\prec$ elca_can$_{v1}$ ) {
32    popEntry=Stack.pop()
33    if(isELCA(popEntry.elca_can,
34       toChildELCA_CAN(popEntry.elca_can,popEntry.CH))
35      output popEntry.elca_can as an ELCA
36    Stack.top().CH += popEntry.elca_can
37  }
38  return popEntry;
```

| 0 | [0.1.1, 0.2.2.2.1] | [] | [] | elca_can   witness nodes    SIB    CH (a) $v_1 = 0.1.1$; $elca\_can_{v_1} = 0$; Figure 7(b); push 0 to stack.

FIG. 8b

| 0.2 | [0.2.1.1, 0.2.2.2.1] | [] | [] |
| 0 | [0.1.1, 0.2.2.2.1] | [] | [] | elca_can   witness nodes    SIB    CH (b) $v_1 = 0.2.1.1$; $elca\_can_{v_1} = 0.2$; Figure 7(b); push 0.2 to stack.

FIG. 8c

| 0.2.2 | [0.2.2.1.1, 0.2.2.2.1] | [] | [] |
| 0.2 | [0.2.1.1, 0.2.2.2.1] | [] | [] |
| 0 | [0.1.1, 0.2.2.2.1] | [] | [] | elca_can   witness nodes    SIB    CH (c) $v_1 = 0.2.2.1.1$: $elca\_can_{v_1} = 0.2.2$; Figure 7(b); push 0.2.2 to stack.

FIG. 8d

| 0.3.2 | [0.3.2.1.1, 0.3.2.2.1] | [] | [] |
| 0 | [0.1.1, 0.3.1.1] | [] | [0.2] | elca_can   witness nodes    SIB    CH (d) $v_1 = 0.3.2.1.1$: $elca\_can_{v_1} = 0.3.2$; Figure 7(c); pop out 0.2.2 and 0.2 and determine them as ELCAs; add 0.2 to top entry's CH; push 0.3.2 to stack.

FIG. 8e

| 0.3.3 | [0.3.3.1.1, 0.3.3.2.1] | [0.3.2] | [] |
| 0 | [0.1.1, 0.4.1.1] | [] | [0.2, 0.3.2] | elca_can   witness nodes    SIB    CH (e) $v_1 = 0.3.3.1.1$: $elca\_can_{v_1} = 0.3.3$; Figure 7(c); pop out 0.3.2 and determine it as an ELCA; add 0.3.2 to 0.3.3's SIB; push 0.3.3 to stack.

FIG. 8f

| elca_can | witness nodes | SIB | CH |
|---|---|---|---|
| 0.3.4 | [0.3.4.1.1, 0.3.4.2.1] | [0.3.2,0.3.3] | [] |
| 0 | [0.1.1, 0.4.1.1] | [] | [0.2,0.3.2,0.3.3] |

(f) $v_1$ = 0.3.4.1.1; $elca\_can_{v1}$ = 0.3.4; Figure 7(c); pop out 0.3.3 and determine it as an ELCA; add 0.3.3 to 0.3.4's SIB; push 0.3.4 to stack.

FIG. 8g

| elca_can | witness nodes | SIB | CH |
|---|---|---|---|
| 0.3 | [0.3.1.1, 0.3.4.2.1] | [] | [0.3.2, 0.3.3, 0.3.4] |
| 0 | [0.1.1, 0.4.1.1] | [] | [0.2,0.3.2,0.3.3,0.3.4] |

(g) $v_1$ = 0.3.5.1; $elca\_can_{v1}$ = 0.3; Figure 7(d); pop out 0.3.4 and determine it as an ELCA; add 0.3.4 entry's SIB list and 0.3.4 to 0.3's CH; push 0.3 to stack.

FIG. 8h

| elca_can | witness nodes | SIB | CH |
|---|---|---|---|
| 0.4.2 | [0.4.2.1.1,0.4.2.2.1] | [] | [] |
| 0 | [0.1.1, 0.4.1.1] | [] | [0.2,0.3.2,0.3.3,0.3.4,0.3] |

(h) $v_1$ = 0.4.2.1.1; $elca\_can_{v1}$ = 0.4.2; Figure 7(c); pop out 0.3 and determine it as an ELCA; push 0.4.2 to stack.

FIG. 8i (i) No more "XML" nodes: clean up the stack; pop out 0.4.2 and 0 and determine them as ELCAs; Stack becomes empty.

FIG. 10

PERFORMING A KEYWORD SEARCH BASED ON IDENTIFYING EXCLUSIVE LOWEST COMMON ANCESTOR (ELCA) NODES

TECHNICAL FIELD

The invention relates generally to performing a keyword search in data based on determining exclusive lowest common ancestor (ELCA) nodes.

BACKGROUND

Keyword searches are often performed to extract information from collections of data, such as from websites available over the Internet. Traditional keyword searching has focused on keyword searching for information contained in HTML (Hypertext Markup Language) documents. However, due to various limitations associated with using HTML documents, the Extensible Markup Language (XML) data model has been developed. The XML data model allows for extensible element tags that can be arbitrarily nested within XML documents. A challenge associated with keyword searching over XML documents is that a keyword search result may not be the entire XML document, but can be a deeply nested XML element.

To avoid challenges posed by keyword searching in XML documents, the notion of lowest common ancestors (LCAs) has been proposed. However, conventional LCA-based techniques are relatively inefficient.

SUMMARY

In general, according to an embodiment, a method of performing a keyword search in data includes providing a candidate set of identified nodes from a list of hierarchically arranged nodes that represent content of the data. The identifying nodes are candidate exclusive lowest common ancestor (ELCA) nodes. It is then determined which of the candidate ELCA nodes are actual ELCA nodes.

Other or alternative features will become apparent from the following description, from the drawings, and from the claims.

BRIEF DESCRIPTION OF THE DRAWINGS

FIG. 6 illustrates pseudocode for performing a stack-based algorithm, according to an embodiment.

FIGS. 7(*a*)-7(*e*) illustrate possible relationships between candidate ELCA nodes.

FIGS. 8(*a*)-8(*i*) illustrate content of a stack at different steps of performing the stack-based algorithm according to an embodiment.

DETAILED DESCRIPTION

In accordance with some embodiments, a lowest common ancestor (LCA)-based technique is used for performing keyword searching in Extensible Markup Language (XML) documents. Although reference is made to performing keyword searching in XML documents, note that techniques according to some embodiments can also be applied to other types of documents or data. A benefit of using keyword searching, rather than traditional database query language searching (e.g., Structured Query Language or SQL query searching), is that users do not have to be familiar with a relatively complex query language or have prior knowledge about the structure of the underlying data (e.g., databases, tables, etc.). The LCA-based technique according to some embodiments provides a relatively efficient technique in which LCA-based query semantics referred to as "exclusive lowest common ancestors (ELCA)" can be used.

According to ELCA, the result of a keyword query Q is the set of nodes that contain at least one occurrence of all of the query keywords either in their labels or in the labels of their descendant nodes, after excluding the occurrences of the keywords in the subtrees that already contain at least one occurrence of all the query keywords. A "label" of a node refers to keywords contained in the node. An example is explained in the context of FIG. 1, which depicts a hierarchical arrangement of nodes that represent an XML document. Each node represents a corresponding part of the XML document, as defined by a corresponding pair of extensible element tags in the XML document. The hierarchical arrangement shown in FIG. 1 is a tree, and results from nesting of extensible element tags.

Figure 1:
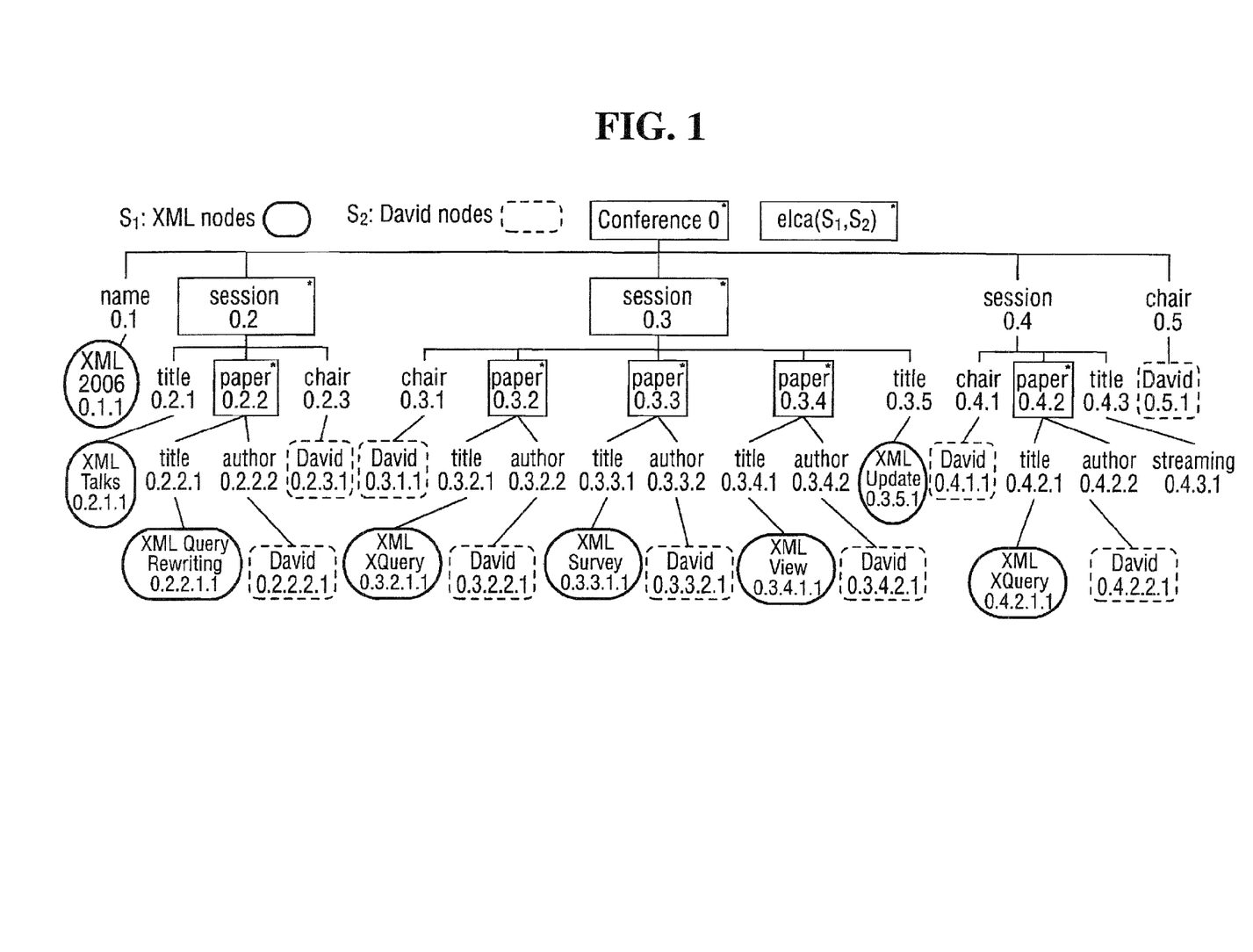
FIG. 1 illustrates exemplary hierarchical arrangement of nodes that represent an Extensible Markup Language (XML) document, to which techniques according to some embodiments can be applied.

In the example, the answers to the keyword query "XML David" (the keywords are "XML" and "David") on the data in FIG. 1 is the node list [0, 0.2, 0.2.2, 0.3, 0.3.2, 0.3.3, 0.3.4, 0.4.2] (where the numbers in this list are identifiers or IDs of the respective nodes).

The answers show that "David" is an author of five papers that have "XML" in the titles (rooted at 0.2.2, 0.3.2, 0.3.3, 0.3.4, and 0.4.2); and that "David" is the chair of two sessions that have "XML" in the titles (rooted at 0.2 and 0.3), and the chair of the conference (rooted at 0) whose name contains "XML". Notice that the node with ID 0.4 is not an ELCA answer since the only "XML" instance (node 0.4.2.1.1) under 0.4 is under one of its children (0.4.2) which already contains keyword instances of both "XML" and "David". Therefore under the exclusion requirement in the ELCA definition, the session node 0.4 is not an ELCA answer. The node Conference rooted at 0 is an ELCA answer since it contains the node 0.1.1 and the node 0.5.1 which are not under any child of the node 0 that contains instances of both keywords "XML" and "David".

In accordance with some embodiments, an efficient algorithm referred to as an indexed stack algorithm is used to identify ELCA nodes in response to a keyword search query. The indexed stack algorithm computes elca($S_1, \ldots, S_k$), where $S_1$ is chosen to be the smallest among $S_1, \ldots, S_k$ since elca($S_1, \ldots, S_k$)=elca($S_{j_1}, \ldots, S_{j_k}$), where $j_1, \ldots, j_k$ is any permutation of $1, 2, \ldots, k$. $S_i$ (i=1, 2, \ldots, k) represents a set of nodes whose labels contain a respective keyword $w_i$ of the query Q. In the example of FIG. 1, the set $S_1$ includes nodes containing keyword "XML," and the set $S_2$ includes the nodes containing keyword "David." There is a benefit in using the smallest list as $S_1$ to reduce complexity of the algorithm. We assume |S| denotes the size of the largest inverted list. The indexed stack algorithm starts from the smallest list $S_1$, visits each node in $S_1$, but does not need to access every node in other lists. It achieves relatively high efficiency, especially when the smallest list is significantly smaller than the largest list.

The function elca $(S_1, \ldots, S_k)$ is used to compute the query result of a keyword query Q that contains k keywords. More specifically, the query result of a keyword query Q consisting of k keywords $w_1, \ldots, w_k$ is defined to be $$\text{elca}(w_1, \ldots, w_k) = \text{elca}(S_1, \ldots, S_k),$$

where $\text{elca}(S_1, \ldots S_k) = \{v | \exists n_1 \in S_1, \ldots, n_k \in S_k (v = \text{lca}(n_1, \ldots, n_k) \land \forall i (1 \leq i \leq k) \nexists x (x \in \text{elca}(S_1, \ldots, S_k) \land \text{child}(v, n_i) \leq_a x))\}$ where $S_i$ denotes the inverted list of $w_i$, i.e., the list of nodes sorted by ID whose label directly contains $w_i$, and child$(v, n_i)$ is the child of v in the path from v to $n_i$. The node $n_i$ is called an ELCA witness node of v in $S_i$. Note that a node v is an ELCA of $S_1, \ldots, S_k$ if and only if $v \in \text{elca}(S_1, \ldots, S_k)$.

In FIG. 1, elca("XML", "David")=elca$(S_1, S_2)$=[0, 0.2, 0.2.2, 0.3, 0.3.2, 0.3.3, 0.3.4, 0.4.2]. The node 0.1.1 is an ELCA witness node of the node 0 in $S_1$ and the node 0.5.1 is an ELCA witness node of the node 0 in $S_2$.

Figure 2:
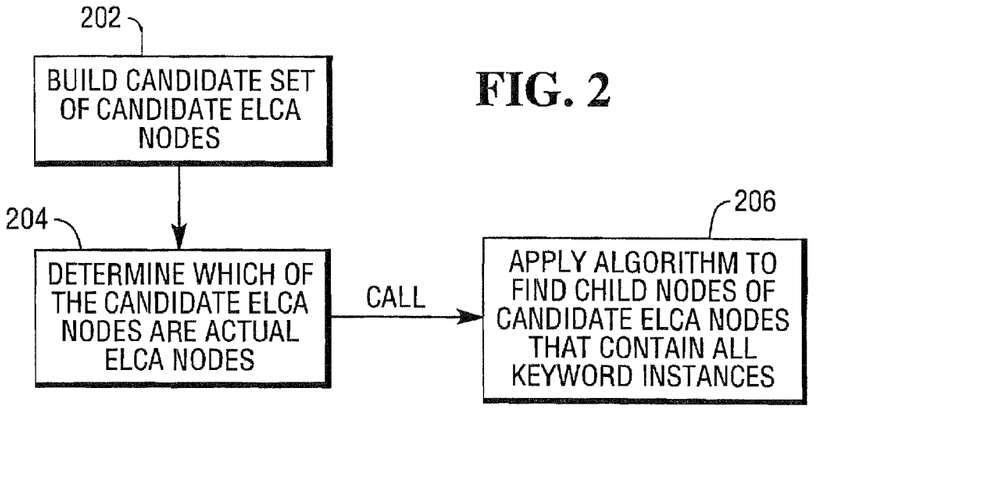
FIG. 2 is a flow diagram of a process according to an embodiment.

As depicted in FIG. 2, an algorithm according to some embodiments for identifying ELCA nodes for the purpose of performing a keyword search in response to query Q first builds (at 202) an ELCA candidate set, which contains candidate ELCA nodes. Note that the ELCA candidate set is a superset of elca$(S_1, \ldots, S_k)$; in other words, elca$(S_1, \ldots, S_k)$ is a subset of the ELCA candidate set. In other words, a candidate ELCA node may or may not be an actual ELCA node. Following the building of the ELCA candidate set that contains candidate ELCA nodes, the algorithm next determines (at 204) which of the candidate ELCA nodes are actual ELCA nodes. The determined actual ELCA nodes constitute the output that is used to return the search results in response to the keyword query Q.

Note that in determining whether a candidate ELCA node, referred to as v, is an actual ELCA node, such determination is based on finding child nodes of each candidate ELCA node that contain all keyword instances. Thus, to determine which of the candidate ELCA nodes are actual ELCA nodes (204), a call is made to apply an algorithm (at 206) to find child nodes (of candidate ELCA nodes) that contain all keyword instances.

Additional ELCA query semantics are provided below.

XML documents are modeled as trees using a labeled ordered tree model. Each node v of the tree corresponds to an XML element and is labeled with an XML tag $\lambda(v)$. The notation $v <_a v'$ denotes that node v is an ancestor of node v'; $v \leq_a v'$ denotes that $v <_a v'$ or $v = v'$.

The lowest common ancestor (LCA) of k nodes (sets) is computed by a function lca$(v_1, \ldots, v_k)$, which computes the lowest common ancestor (LCA) of nodes $v_1, \ldots, v_k$. The LCA of sets $S_1, \ldots, S_k$ is the set of LCAs for each combination of nodes in $S_1$ through $S_k$:

$$\text{lca}(S_1, \ldots, S_k) = \{\text{lca}(n_1, \ldots, n_k) | n_1 \in S_1, \ldots, n_k \in S_k\}.$$

For example, in FIG. 1, lca$(S_1, S_2)$=[0, 0.2, 0.2.2, 0.3, 0.3.2, 0.3.3, 0.3.4, 0.4, 0.4.2]. Note that lca$(S_1, S_2)$ contains more nodes than elca$(S_1, \ldots, S_k)$.

A node v is called an LCA of sets $S_1, \ldots, S_k$ if $v \in \text{lca}(S_1, \ldots, S_k)$. A node v is called an exclusive lowest common ancestor (ELCA) of $S_1, \ldots, S_k$ if and only if there exist nodes $n_1 \in S_1, \ldots, n_k \in S_k$ such that $v = \text{lca}(n_1, \ldots, n_k)$ and for every $n_i (1 \leq i \leq k)$ the child of v in the path from v to $n_i$ is not an LCA of $S_1, \ldots, S_k$ itself nor an ancestor of any LCA of $S_1, \ldots, S_k$.

The smallest lowest common ancestor (SLCA) of k sets $S_1, \ldots, S_k$ is defined to be $$\text{slca}(S_1, \ldots, S_k) = \{v | v \in \text{lca}(S_1, \ldots, S_k) \land \forall v' \in \text{lca}(S_1, \ldots, S_n) v \not<_a v'\}.$$

A node v is called a smallest lowest common ancestor (SLCA) of $S_1, \ldots, S_k$ if $v \in \text{slca}(S_1, \ldots, S_k)$. Note that a node in slca$(S_1, \ldots, Sn)$ cannot be an ancestor node of any other node in slca$(S_1, \ldots, S_n)$.

In FIG. 1, slca$(S_1, S_2)$=[0.2.2, 0.3.2, 0.3.3, 0.3.4, 0.4.2]. Thus, slca$(S_1, \ldots, S_k) \subset$ elca$(S_1, \ldots, S_k)$. For example, consider $S_1$ and $S_2$ in FIG. 1. The node 0.2 is not in slca$(S_1, S_2)$ but is in elca$(S_1, S_2)$, and the node 0.4 is not in elca$(S_1, S_2)$ but in lca$(S_1, S_2)$.

In one exemplary implementation, each node of the tree is assigned a Dewey ID pre(v) (e.g., 0.2, 0.3.4, etc., in FIG. 1) that is compatible with preorder numbering, in the sense that if a node $v_1$ precedes a node $v_2$ in the preorder left-to-right depth-first traversal of the tree then pre$(v_1)$<pre$(v_2)$. Dewey numbers provide a straightforward solution to locating the LCA of two nodes. The usual < relationship holds between any two Dewey numbers. Given two nodes $v_1, v_2$ and their Dewey numbers $p_1, p_2$, lca$(v_1, v_2)$ is the node with the Dewey number that is the longest common prefix of $p_1$ and $p_2$. For example, in FIG. 1 lca(0.2.2.1.1, 0.2.2.2.1)=0.2.2.

A candidate set (as built at 202) is referred to as the set elca_can$(S_1; S_2, \ldots, S_k)$ whose members are called ELCA_CAN nodes (or candidate nodes) (of $S_1$ among $S_2, \ldots, S_k$):

$$\text{elca\_can}(S_1; S_2, \ldots, S_k) = \bigcup_{v_1 \in S_1} \text{slca}(\{v_1\}, S_2, \ldots, S_k).$$

Note that a node v is an ELCA_CAN node if there exist $n_1 \in S_1, \ldots, n_k \in S_k$ such that $v = \text{lca}(n_1, \ldots, n_k)$ and there does not exist $n'_2 \in S_2, \ldots, n'_k \in S_k$ such that $v' = \text{lca}(n_1, n'_2, \ldots, n'_k)$ and $v <_a v'$. In other words, v is a candidate ELCA node if v is a least common ancestor of $S_1, \ldots, S_k$, and there is no descendant of v, referred to as v', that is a least common ancestor of $n, n'_2, \ldots, n'_k$. Every $n_i (1 \leq i \leq k)$ is called an ELCA_CAN witness node of v in $S_i$.

For example, in FIG. 1 elca_can$(S_1; S_2)$=[0, 0.2, 0.2.2, 0.3, 0.3.2, 0.3.3, 0.3.4, 0.4.2]. Next consider the ELCA_CAN node 0.2. The nodes 0.2.1.1 and 0.2.2.2.1 are its witness nodes in $S_1$ and $S_2$ respectively. However the node 0.2.2.1.1 is not a witness node for 0.2 in $S_1$. This is because although the node 0.2 is the LCA of the node 0.2.2.1.1 from $S_1$ and the node 0.2.3.1 from $S_2$, there exists the node 0.2.2.2.1 from $S_2$ such that the LCA of 0.2.2.1.1 and 0.2.2.2.1 (i.e., 0.2.2) is a descendant of 0.2.

Note that elca_can$(S_1; S_2, \ldots, S_k)$ may contain nodes that are ancestors of other nodes of elca_can$(S_1; S_2, \ldots, S_k)$. The following inclusion relationship between elca and elca_can applies.

Property 1.

$\forall i \in [1, \ldots, k], \text{elca}(S_1, \ldots, S_k) \subseteq \text{elca\_can}(S_i; S_1, \ldots, S_{i-1}, S_{i+1}, \ldots, S_k).$ Of particular significance is the instantiation of the above property for i=1 (i.e., elca$(S_1, \ldots, S_k) \subseteq$ elca_can$(S_1; S_2, \ldots, S_k)$) since elca_can$(S_1; S_2, \ldots, S_k)$ has the most efficient computation (recall $S_1$ is the shortest inverted list).

In FIG. 1, elca$(S_1, S_2)$ and elca_can$(S_1; S_2)$ happen to be the same. However if the node 0.3.1.1 is removed from the tree of FIG. 1, then elca_can($S_1$,$S_2$) stays the same but the node 0.3 would not be in elca($S_1$,$S_2$) anymore. Therefore, elca($S_1$,$S_2$) ⊂ elca_can($S_1$,$S_2$).

For brevity, elca_can(v) for v∈$S_1$ is defined to be the node l where {l}=elca_can({v};$S_2$, . . . , $S_k$)=slca({v},$S_2$, . . . , $S_k$). The node elca_can(v) is called the exclusive lowest common ancestor candidate or ELCA_CAN of v (in sets of $S_2$, . . . , $S_k$). Note that each node in lca({v},$S_2$, . . . , $S_k$) is either an ancestor node of v or v itself and elca_can(v) is the lowest among all nodes in lca({v},$S_2$, . . . , $S_k$). For instance, consider $S_1$ and $S_2$ in FIG. 1. elca_can(0.1.1)=0, elca_can(0.2.1.1)=0.2, elca_can(0.2.2.1.1)=0.2.2, elca_can(0.3.2.1.1)=0.3.2, elca_can(0.3.3.1.1)=0.3.3, elca_can(0.3.4.1.1)=0.3.4, elca_can(0.3.5.1)=0.3 and elca_can(0.4.2.1.1)=0.4.2.

The following describes a relatively efficient technique according to an embodiment for computing elca_can(v).

To compute slca({v},$S_2$) where $S_2$={$u_1$, . . . , $u_n$}, an observation is that the witness node in $S_2$ for slca($v_1$,$S_2$) must be one of the two closest nodes (in document order) to v among all nodes in the set $S_2$. The algorithm can efficiently find the only two nodes of {$u_1$, . . . , $u_n$} that are candidates for witnessing the SLCA, by using two functions: the function rm(v,S) computes the right match of v in a set S, that is the node of S that has the smallest ID that is greater than or equal to pre(v); lm(v,S) computes the left match of v in a set S, that is the node of S that has the biggest ID that is less than or equal to pre(v). The function rm(v,S)(lm(v,S)) returns null when there is no right (left) match node. For example, consider again $S_1$ and $S_2$ in FIG. 1 and the node v=0.3.2.1.1 from $S_1$. The right match for v in $S_2$ is the node 0.3.2.2.1, and the left match for v in $S_2$ is the node 0.3.1.1. Consequently slca({v}, $S_2$) is the lower node from lca(v, rm(v, $S_2$)) and lca(v, lm(v, $S_2$)). Consider again $S_1$, $S_2$, and v=0.3.2.1.1 from $S_1$ in FIG. 1, elca_can(0.3.2.1.1)=0.3.2. This is because lca(v, rm(v, $S_2$))=lca(v, 0.3.2.2.1)=0.3.2, lca(v, lm(v, $S_2$))=lca(v, 0.3.1.1)=0.3, and 0.3<$_a$0.3.2.

The above applies to the computation of slca({v},$S_2$, . . . , $S_k$). The node elca_can(v) (i.e., slca({v},$S_2$, . . . , $S_k$)) can be efficiently computed as follows: First, the algorithm computes the (unique) SLCA $v_2$ of v and of the nodes of $S_2$. The algorithm then continues by iteratively computing the (unique) SLCA $v_i$ of $v_{i-1}$ and $S_i$, until i becomes k. The node $v_k$ is the result.

Notice though that the nodes of elca_can($S_1$,$S_2$, . . . , $S_k$) may be obtained out of order by applying the above computation on each node in $S_1$. For example in FIG. 1, elca_can (0.3.2.1.1)=0.3.2 and elca_can(0.3.5.1)=0.3. Thus the ELCA_CAN node 0.3 is computed after the ELCA_CAN node 0.3.2.

Once the candidate set has been computed, it is next determined whether the candidate ELCA nodes in the candidate set are actually ELCA nodes. A particular function, referred to in one example as function isELCA which is used to determine whether an ELCA_CAN node v is an ELCA node or not. Let child_elcacan(v) be the set of children of v that contain all keyword instances. Equivalently child_elcacan(v) is the set of child nodes u of v such that either u or one of u's descendant nodes is an ELCA_CAN node, i.e., child_elcacan(v)={u|u∈child(v)∧∃x(u≤$_a$x∧x∈elca_can ($S_1$;$S_2$, . . . , $S_k$))}, where child(v) is the set of child nodes of v. ELCA_CAN is used in the above definition of child_elcacan(v) because elca_can($S_1$;$S_2$, . . . , $S_k$) can be efficiently computed as discussed above. For $S_1$ and $S_2$ of the running example in FIG. 1, child_elcacan(0)=[0.2, 0.3, 0.4] and child_elcacan (0.2)=[0.2.2].

Figure 3:
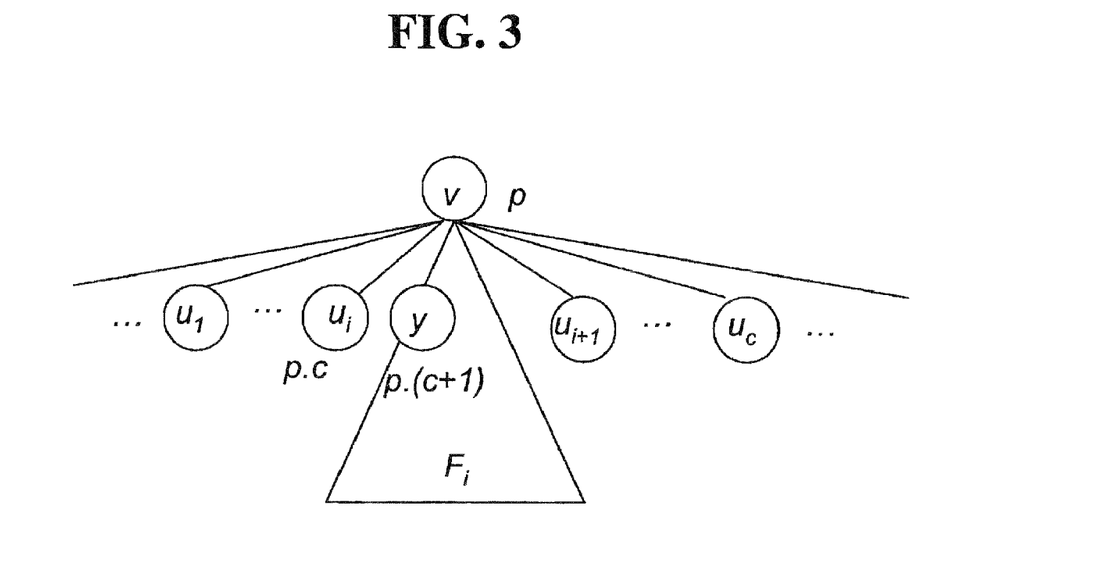
FIG. 3 illustrates a candidate ELCA node and its children nodes.

Assume child_elcacan(v) is {$u_1$, . . . , $u_c$}, as depicted in FIG. 3. By definition, an ELCA node v must have ELCA witness nodes $n_1$, . . . , $n_k$ such that $n_1$∈$S_1$, . . . , $n_k$∈$S_k$ and every $n_i$ is not in the subtrees rooted at the nodes from child_elcacan (v).

To determine whether v is an ELCA node, each $S_i$ is probed to see if there is a node $x_i$∈$S_i$ such that $x_i$ is either in the forest under v to the left of the path $vu_1$, or in the forest under v to the right of the path $vu_c$, or in any forest $F_i$ (see FIG. 3) that is under v and between the paths $vu_i$ and $vu_{i+1}$, i=1, . . . , c-1. The last case can be checked efficiently by finding the right match rm(y,$S_i$) of the node y in $S_i$ where y is the immediate right sibling of $u_i$ among the children of v. Assume pre(v)=p, pre ($u_i$)=p.c where c is a single number, then pre(y)=p.(c+1), as shown in FIG. 2. Let the right match of y in $S_i$ be x (i.e., x=rm(y,$S_i$)). Then x is a witness node in the forest $F_i$ if and only if pre(x)<pre($u_i$+1).

Given the list ch which is the list of nodes in child_elcacan (v) sorted by ID, the function isELCA(v,ch) returns true if v is an ELCA node by applying the operations described in the previous paragraph. As an example, consider the query "XML David" and the inverted lists $S_1$ and $S_2$ in FIG. 1.

child_elcacan(0)=[0.2, 0.3, 0.4]

The below provides an example of how isELCA(0, [0.2, 0.3, 0.4]) works and returns true. In this example, the number of keywords is two (k=2) and |ch|=3. First the function isELCA searches and finds the existence of an ELCA witness node (i.e., the node 0.1.1) for 0.2 in $S_1$ in the subtree rooted under 0 to the left of the path from 0 to 0.2 (0.2 is the first child ELCA_CAN node of 0). Then the function searches the existences of an ELCA witness node in $S_2$ for 0 in the forest to the left of the path from 0 to 0.2; in the forest between the path from 0 to 0.2 and the path from 0 to 0.3; in the forest between the path from 0 to 0.3 and the path from 0 to 0.4; in the forest to the right of the path from 0 to 0.4. All of the above searches fail except that the last search successfully finds a witness node (0.5.1) for 0.2 in $S_2$. Therefore, isELCA(0, [0.2, 0.3, 0.4]) returns true.

Figure 4:
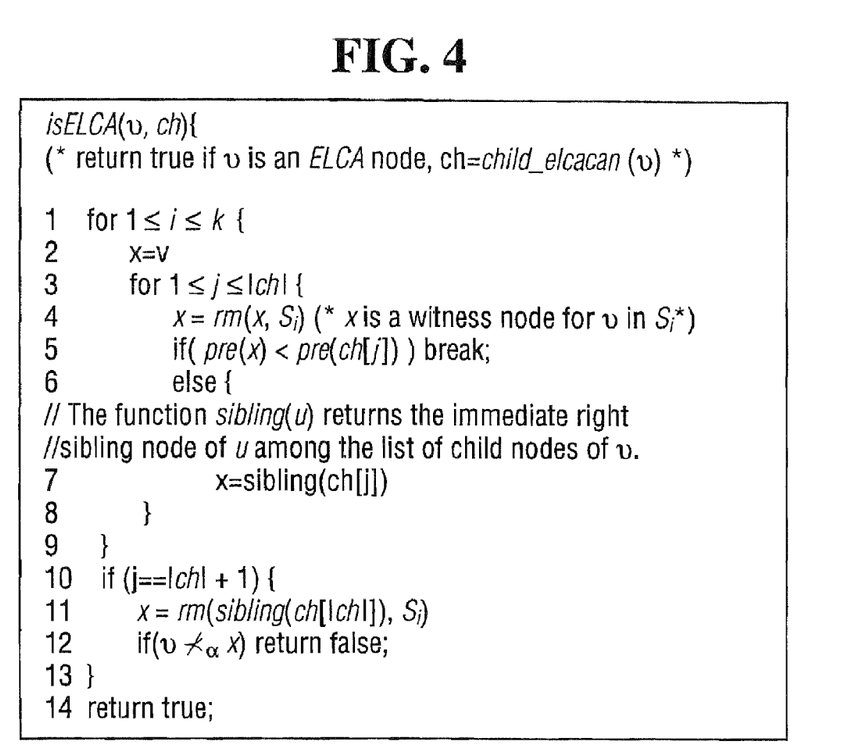
FIG. 4 illustrates pseudocode for determining whether or not a node in a hierarchical arrangement is an exclusive lowest common ancestor (ELCA) node, in accordance with an embodiment.

An example pseudocode for isELCA(v,ch) is provided in FIG. 4.

As noted above in the discussion of FIG. 2, in determining which of the candidate ELCA nodes are actual ELCA nodes (204), a call is made to an algorithm to find child nodes of candidate ELCA nodes that contain all keyword instances; in other words, this algorithm computes all child_elcacan(v) for each ELCA_CAN node v.

Figure 5:
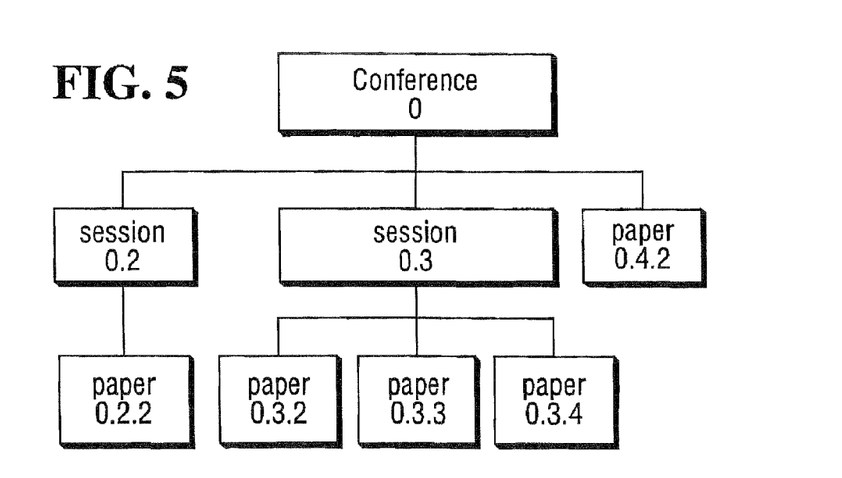
FIG. 5 illustrates a portion of the hierarchical arrangement of FIG. 1.
Figure 7:
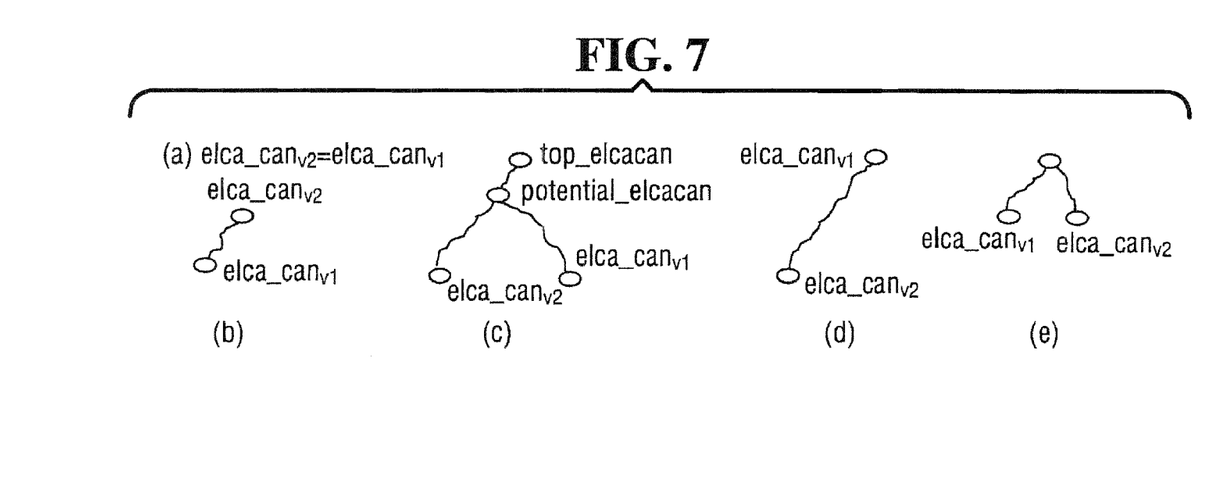

A straightforward algorithm to compute elca($S_1$, . . . , $S_k$) works as follows where TS is a tree structure initialized to empty:

1. For each node v in $S_1$, compute l=elca_can(v) as discussed above and do TS.insert(l) which inserts l to the appropriate place in the tree TS based on l's ancestor-descendant relationship with nodes already inserted in TS. The tree in FIG. 5 shows the result from this step for computing elca($S_1$,$S_2$) in FIG. 1.
2. For each node l in TS check whether l is an ELCA_CAN node or not by calling isELCA(l, child_elcacan(l)) where child_elcacan(l) can be easily computed from the list of child nodes of l in TS.

In an alternative embodiment, a more efficient "one pass" stack-based algorithm is used. The stack-based algorithm does not have to keep all ELCA_CAN nodes in memory; it uses a stack whose depth is bounded by the depth of the tree based on some key tree properties. At any time during the computation any node in the stack is a child or descendant node of the node below it (if present) in the stack. Therefore the nodes from the top to the bottom of the stack at any time are from a single path in the input tree.

The stack-based algorithm goes through every node $v_1$ in $S_1$ in order, computes $elca\_can_{v_1} = elca\_can(v_1)$ and creates a stack entry stackEntry consisting of $elca\_can_{v_1}$. If the stack is empty, stackEntry is pushed to the stack to determine later whether $elca\_can_{v_1}$ is an ELCA node or not. If the stack is not empty, what the algorithm does depends on the relationship between stackEntry and the top entry in the stack. The algorithm either discards stackEntry or pushes stackEntry to the stack (with or without first popping out some stack entries). The algorithm does not need to look at any other non-top entry in the stack at any time and only determines whether in ELCA_CAN node is an ELCA node at the time when a stack entry is popped out.

Each stack entry stackEntry created for node $v_1$ in $S_1$ has the following three components.

stackEntry.elca_can is $elca\_can(v_1)$;

stackEntry.CH records the list of child or descendant ELCA_CAN nodes of stackEntry.elca_can seen so far, which will be used by isELCA() to determine whether stackEntry.elca_can is an ELCA node at the time when this entry is popped out from the stack;

and stackEntry.SIB (short for siblings) is the list of ELCA_CAN nodes before stackEntry.elca_can (in document order) such that the LCA node of nodes from the list and stackEntry.elca_can potentially can be an ELCA_CAN node that has not been seen so far.

The need for and role of stackEntry.SIB is explained in the context of the following running example "XML David". Before $elca\_can(0.3.5.1)=0.3$ is computed, 0.3.2, 0.3.3, 0.3.4 have already been computed as ELCA_CAN nodes which are the children ELCA_CAN nodes of 0.3. These three ELCA_CAN nodes are stored in order to determine whether 0.3 is an ELCA node or not before 0.3 is seen in the processing, which is achieved by first storing 0.3.2 in the SIB component of the stack entry associated with 0.3.3 and then storing 0.3.2 and 0.3.3 in the SIB component of the stack entry associated with 0.3.4 (after the stack entry associated with 0.3.3 is popped out) during the processing before 0.3 is seen. Note that if the node 0.3.1.1 was not in the tree in FIG. 1, the algorithm would still see 0.3 in the processing as an ELCA_CAN node and still see 0.3 after 0.3.2, 0.3.3, and 0.3.4, but then 0.3 would not be an ELCA node, which could be determined only if the algorithm kept the information that 0.3.2, 0.3.3, and 0.3.4 are ELCA_CAN nodes until the algorithm sees 0.3 and knows that 0.3 would not have any child or descendant ELCA_CAN nodes in the processing later after the algorithm sees 0.3. It is possible that the algorithm would not see 0.3 at all in the processing (i.e., if the node 0.3.5.1 was not in the tree, 0.3 would not be an ELCA_CAN node) in which case the algorithm still needs to keep 0.3.2, 0.3.3, and 0.3.4 until the point the algorithm is sure that those nodes cannot be child or descendant of any other ELCA_CAN nodes.

FIG. 6 presents an exemplary pseudocode for the stack-based algorithm.

For each node $v_1$ in $S_1$ (line 2), the algorithm computes $elca\_can_{v_1} = elca\_can(v_1)$ (line 4). The algorithm creates a stack entry stackEntry consisting of $elca\_can_{v_1}$ (line 6). If the stack is empty (line 7), the algorithm simply pushes stackEntry to the Stack to determine later whether $elca\_can_{v_1}$ is an ELCA node or not. If the stack is not empty, let the node at the top of the stack be $elca\_can_{v_2}$ (lines 9-10). FIGS. 7(a) to 7(e) show the only five relationships the two ELCA_CAN nodes $elca\_can_{v_2}$ and $elca\_can_{v_1}$ (in fact any two nodes) can have.

In the first case where $elca\_can_{v_1}$ and $elca\_can_{v_2}$ are the same (FIG. 7(a), line 11), $elca\_can_{v_1}$ is discarded.

In the second case where $elca\_can_{v_2}$ is an ancestor of $elca\_can_{v_1}$ (FIG. 7(b)), the algorithm pushes stackEntry to the stack to determine later whether $elca\_can_{v_1}$ is an ELCA node or not (line 12).

In the third case (FIG. 7(c)) where $elca\_can_{v_2}$ and $elca\_can_{v_1}$ have no ancestor-descendant relationship and $elca\_can_{v_1}$ appears after $elca\_can_{v_2}$ in document order (line 13), the algorithm pops the top stack entry repeatedly (line 14) until either the stack is empty or the ELCA_CAN node of the top entry in the Stack (named top_elcacan in FIG. 7(c), line 15) is an ancestor of $elca\_can_{v_1}$ by calling the function popStack(). When a stack entry is popped out, the ELCA_CAN node in the stack entry is checked whether it is an ELCA node or not (by isELCA()). Note that there will not be any ELCA_CAN node in later processing that can be a child or descendant node of any popped out ELCA_CAN node. That is why the algorithm can pop out those entries and check for ELCA nodes. Let popEntry be the last popped out entry and potential_elcacan be the LCA of popEntry.elca_can and $elca\_can_{v_1}$ (FIG. 7(c), line 16). If the stack is not empty and the top stack entry's node top_elcacan is an ancestor of potential_elcacan (FIG. 7(c), line 17), then the algorithm sets the SIB list associated with $elca\_can_{v_1}$ to be the concatenation of the SIB list in popEntry and popEntry.elca_can (line 18). The algorithm then pushes stackEntry to the stack (line 19). The reason that the algorithm needs to carry on the nodes stored in the SIB component of popEntry to stackEntry was explained above in the example illustrating the need for and role of the SIB component in a stack entry. During the processing of the example, at one point $elca\_can_{v_2}$ is 0.3.2, $elca\_can_{v_1}$ is 0.3.3, potential_elcacan is 0.3, top_elcacan is 0, and after the stack entry for 0.3.2 is popped out, 0.3.2 is stored in the SIB component of the stack entry for 0.3.3. Notice that potential_elcacan could be a node that the algorithm has not seen so far in the processing (i.e., it has not been computed as an ELCA_CAN node) and it could be an ELCA_CAN and an ELCA node. Although the algorithm has guessed its existence here, it may or may not appear later in the processing. That is why the algorithm needs to carry $elca\_can_{v_2}$ to the SIB component of $elca\_can_{v_1}$ for potential_elcacan.

In the fourth case where $elca\_can_{v_1} <_a elca\_can_{v_2}$ (line 21, FIG. 7(d)), it is certain that $elca\_can_{v_2}$ has not more descendant ELCA_CAN nodes. Thus we pop from the stack repeatedly until either the stack the stack is empty or the ELCA_CAN node in the top entry is an ancestor of $elca\_can_{v_1}$ (line 22). Again, the ELCA_CAN node in each popped out entry is checked whether it is an ELCA node or not. Let the last popped out entry be popEntry (line 22). The algorithm copies the SIB list in popEntry and popEntry.elca_can to the CH field of $elca\_can_{v_1}$ (line 23). Then stackEntry is pushed to the top of the stack (line 24). Notice that nodes stored in the SIB field by the processing in the third case are used in the fourth case to set the CH field.

The fifth case, where $elca\_can_{v_1}$ and $elca\_can_{v_2}$ have no ancestor-descendant relationship and $elca\_can_{v_1}$ appears before $elca\_can_{v_2}$, is not possible in the computation when $S_1$ is sorted in document order.

The details of the function $popStack(elca\_can_{v_1})$ (called in the processing of the third and fourth cases in FIG. 7) are discussed below. The function popStack repeatedly pops out the top entry (line 31) until the ELCA_CAN node in the top entry is an ancestor of $elca\_can_{v_1}$ or the stack becomes empty. Each popped out entry is checked regarding whether it contains an ELCA node or not be calling the function isELCA presented in Section 4.3 (line 22). Notice that the function toChildELCA_CAN(v,L) inputs a node v and a list L each node of which is a child or descendant ELCA_CAN node of v and returns child_elcacan(v). Each popped out node is added to the top entry's CH field (line 36) because at any time any ELCA_CAN node in a stack entry is a child or descendant node of the ELCA_CAN node in the stack entry below it (if present).

The stack-based algorithm is illustrated using the query "XML David" on the data of FIG. 1. FIGS. 8(a)-8(i) show the states of the stack after the processing of each node in $S_1$ for computing elca($S_1;S_2$). The caption under each figure describes which node $v_1$ in $S_1$ has just been processed, the ID of the node elca_can$_{v_1}$=elca_can($v_1$), which of the cases in FIGS. 7(a)-7(e) has happened, and the pop/push actions that happened.

Figure 8A:
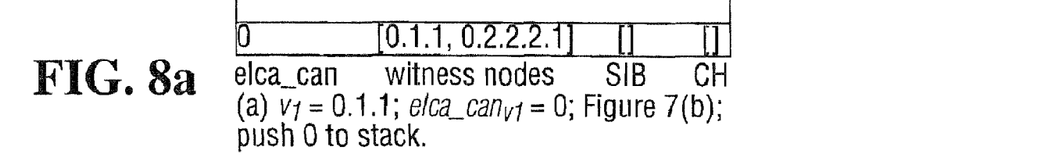
Figure 8B:
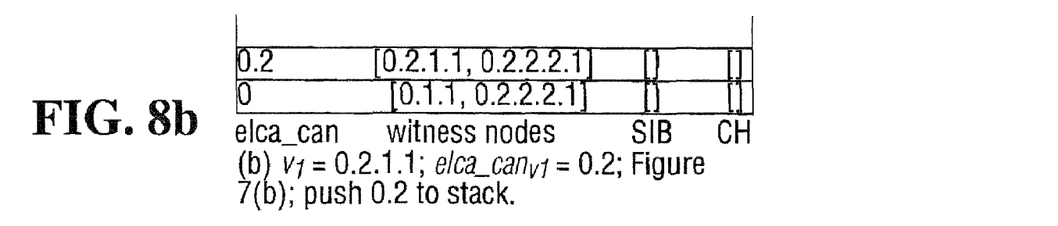
Figure 8C:
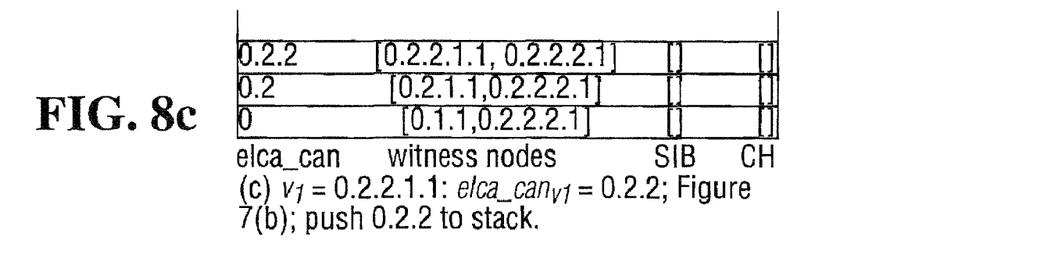

FIGS. 8(a), 8(b), and 8(c) show the processing of the first three $S_1$ nodes, 0.1.1, 0.2.1.1, and 0.2.2.1.1. The case of FIG. 7(b) is applied.

Figure 8D:
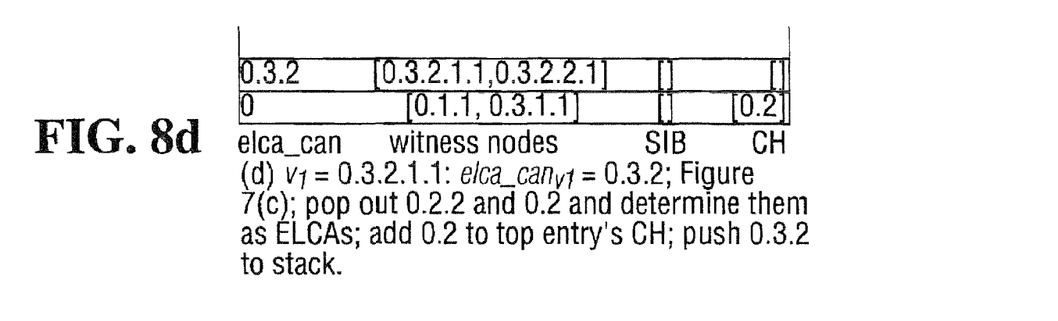

FIG. 8(d) shows the processing of the node 0.3.2.1.1. The case of FIG. 7(c) is applied. The two nodes 0.2.2 and 0.2 are popped out from the stack and determined to be ELCA nodes; the CH field associated with the node 0 is updated with the addition of the node 0.2; and elca_can(0.3.2.1.1)=(0.3.2) is pushed onto the stack.

Figure 8E:
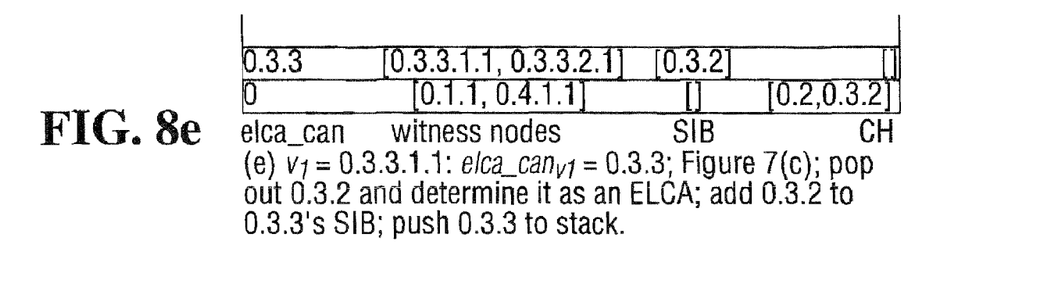
Figure 8F:
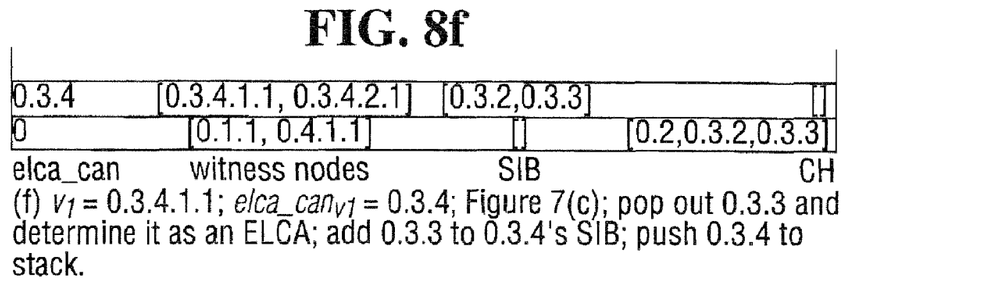

FIG. 8(e) shows the result of processing 0.3.3.1.1 from $S_1$. Note that elca_can=0.3.3. The processing for the case of FIG. 7(c) is applied. The node 0.3.2 is popped out and reported as an ELCA. Also 0.3.2 is stored in the SIB field of the entry associated with 0.3.3. FIG. 8(f) shows the processing of the node 0.3.4.1.1 from $S_1$ which is similar to the processing shown in FIG. 8(e). The node 0.3.3 is popped out and reported as an ELCA, and added to the SIB field of the stack entry associated with 0.3.4. Note that the ELCA_CAN node 0.3 has not been seen yet.

Figure 8G:
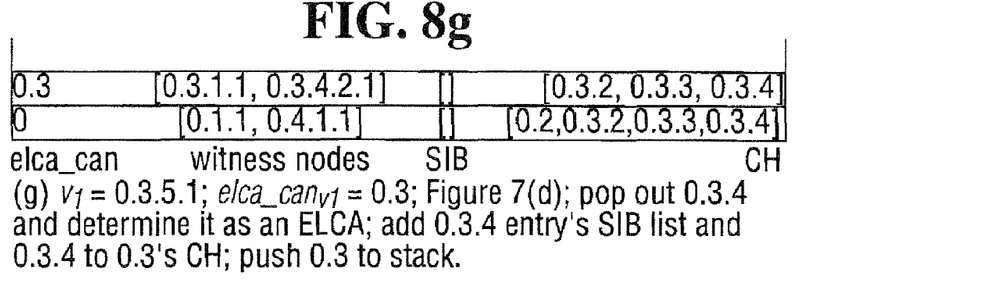

The processing for the node 0.3 shown in FIG. 8(g) is interesting in that it picks up the nodes previously stored in SIB and uses it to update the CH field of the stack entry associated with 0.3. Without this action, the algorithm cannot determine whether the node 0.3 is an ELCA or not because some of its child ELCA_CAN nodes (0.3.2, 0.3.3, and 0.3.4) have been seen and they have to been stored. The node 0.3.4 is popped out and determined to be an ELCA node.

Figure 8H:
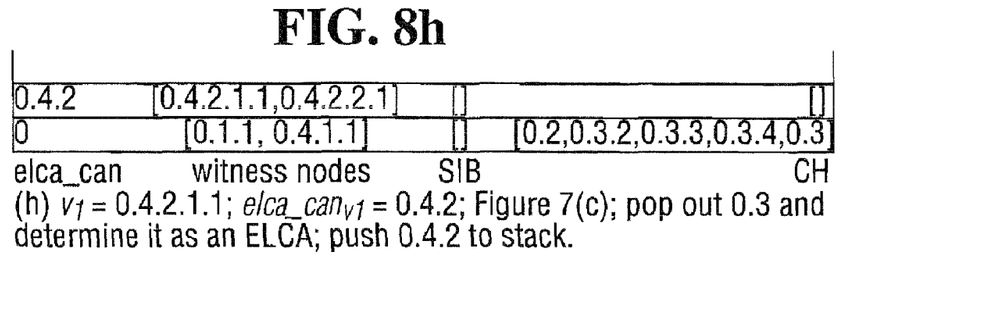
Figure 8I:
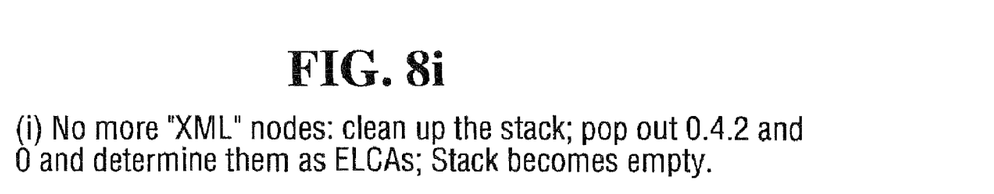

FIG. 8(h) shows the processing of the last node 0.4.2.1.1 from $S_1$ which is similar to the processing shown in FIG. 8(d). The node 0.3 is popped out and determined to be an ELCA node. The node 0.4.2 is pushed onto the stack. At this stage every node in $S_1$ has been processed. FIG. 8(i) shows that after cleaning up the stack, the stack becomes empty and nodes 0.4.2 and 0 are determined to be ELCA nodes.

For better efficiency, notice that the stack-based algorithm can do without storing the child or descendant ELCA_CAN nodes of an ELCA_CAN node in the stack. That is, the CH field in the structure of a stack entry can be removed. The above can be achieved by the following two changes: i) extending the computation of elca_can(v) along with an array of ELCA_CAN witness nodes of elca_can(v); ii) changing the function isELCA's signature accordingly to isELCA(l, WN) where l is an ELCA_CAN node and WN is the list of l's ELCA_CAN witness nodes. The idea is that some of the ELCA_CAN witness nodes of elca_can(v) kept along the way of computing elca_can(v) may be ELCA witness nodes for elca_can(v). If an ELCA_CAN witness node x is also and ELCA witness node for elca_can(v) in a set $S_i$, then there is no need in isELCA() to search for ELCA witness nodes for elca_can(v) in $S_i$. For example in the stack state shown in FIG. 8(h), the child ELCA_CAN node 0.2 of the node 0 is stored in the CH field associated with the node 0 at the bottom of the stack. Instead of carrying the child ELCA_CAN 0.2 of the node 0 from the state shown in FIG. 8(d) to the state shown in FIG. 8(h), the algorithm can at the step shown in FIG. 8(d) update the witness node of 0 from [0.1.1, 0.2.2.2.1] to [0.1.1, 0.3.1.1] after 0.2.2 and 0.2 are popped out and before 0.3 is pushed onto the stack, and update at the step shown in FIG. 8(e) the witness node array of 0 from [0.1.1, 0.3.1.1] to [0.1.1, 0.4.1.1]. In the last step (FIG. 8(i)) after popping out 0.4.2, the algorithm updates the witness node array of 0 to [0.1.1, 0.5.1] and determines that 0 is an ELCA node. Essentially, the algorithm removes the need of storing child ELCA_CAN nodes in the stack's CH fields and carrying them around by reusing the computation of elca_can() in the function isELCA() and by doing some of the work in isELCA() (searching for ELCA witness nodes) as early as possible.

Figure 9:
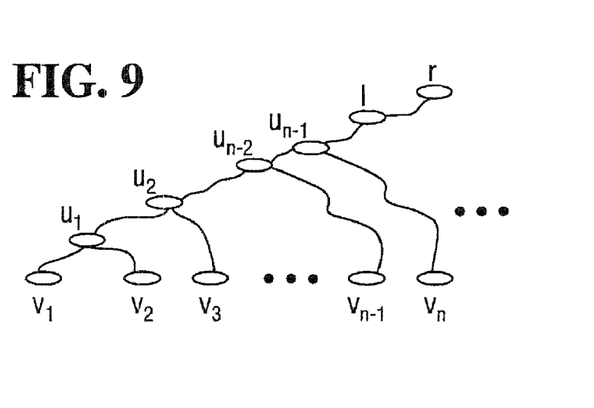
FIG. 9 illustrates an ordered arrangement of candidate ELCA nodes.

Another optimization is to reduce |SIB|. Assume at some point in the processing of the algorithm, the following list of ELCA_CAN nodes are computed in the exact order as they appear—r, $v_1, v_2, \ldots, v_n$, l, as shown in FIG. 9. The algorithm presented in FIG. 6 will at some point push the node r onto the stack; push $v_1$ onto the stack; pop out $v_1$, push $v_2$, and add $v_1$ to the SIB field associated with $v_2$; pop out $v_2$, push $v_3$, and add $v_1$ and $v_2$ to the SIB field associated with $v_3$. When the algorithm pushes $v_n$ onto the stack, the SIB field associated with $v_n$ contains $v_1, \ldots, v_{n-1}$. The basic idea of the optimization to reduce the number of nodes stored in the SIB field is briefly described. The idea is that the algorithm only needs to store $v_1$ in the SIB field of $v_2$; $u_1$ in the SIB field of $v_3$; ...; $u_{n-2}$ in the SIB field of $v_n$.

Figure 10:
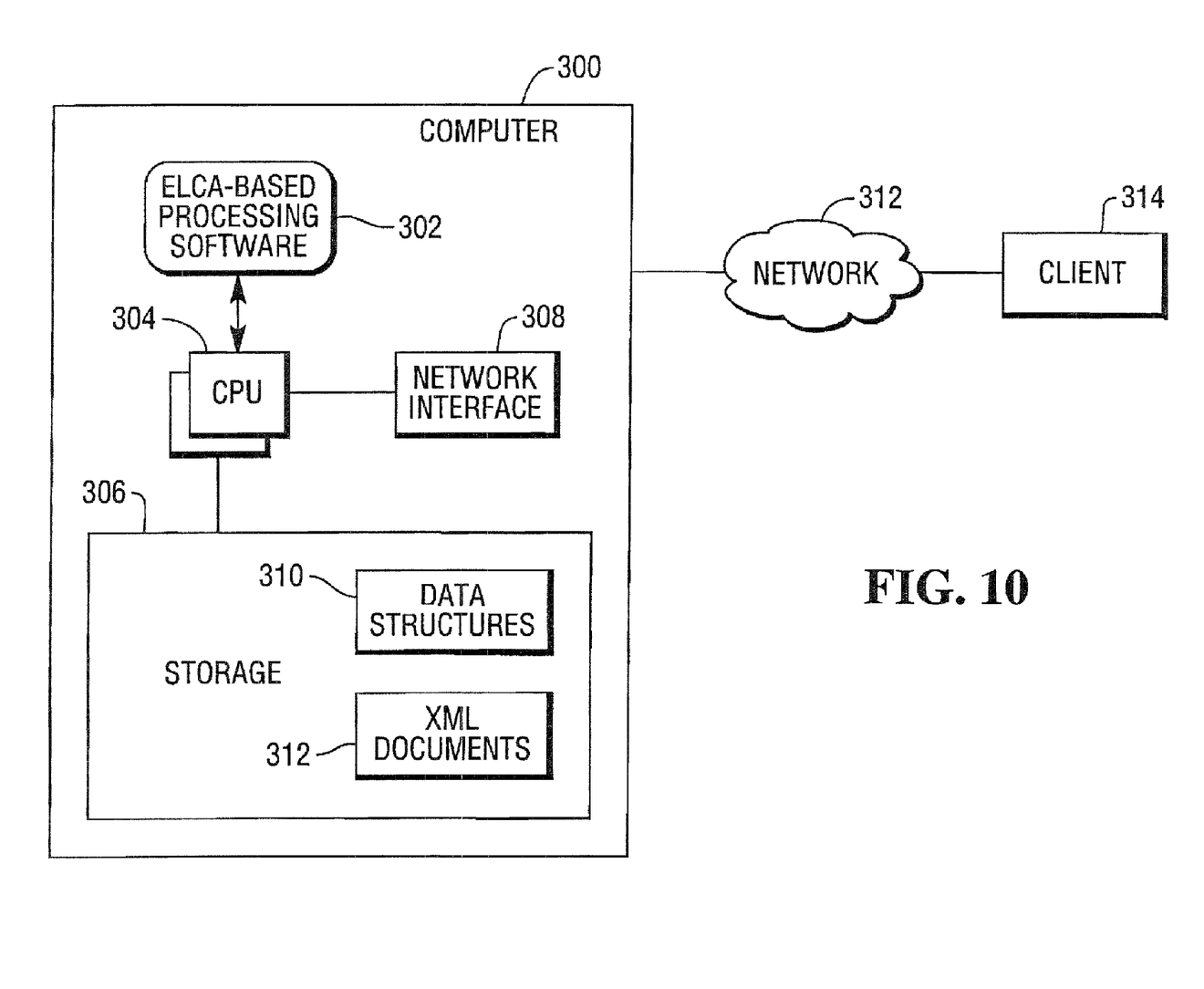
FIG. 10 is a block diagram of an exemplary computer containing software for performing processes according to some embodiments.

FIG. 10 illustrates an exemplary computer 300 on which an ELCA-based processing software 302 is executable. The ELCA-based processing software 302 is executed on one or more central processing units (CPUs) 304, which is connected to a storage 306 and a network interface 308. The storage 306 stores data structures 310, such as the candidate set, stack, and other data structures described above.

The network interface 308 enables the computer 300 to communicate over a network 312 with one or more remote client stations 314, which are able to submit keyword-based queries to the computer 300 to perform keyword-based searching in XML documents 312 stored in a storage 306.

Although one computer 300 is depicted in FIG. 10, it is noted that multiple computers 300 each storing corresponding XML documents can be provided to allow for the client station 314 to submit keyword-based search queries to the multiple computers 300.

Instructions of the software 302 can be loaded for execution on CPU(s) 304, which is (are) an example of a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computer comprising:
   a storage to store a hierarchical arrangement of nodes representing Extensible Markup Language (XML) data;
   a processor responsive to a keyword search query containing query keywords to:
      identify sets of nodes in the hierarchical arrangement for respective query keywords;
      identify a smallest of the sets of nodes; and
      starting with the smallest of the sets of nodes, apply a stack-based algorithm to identify exclusive lowest common ancestor (ELCA) nodes of the hierarchical arrangement.

2. The computer of claim 1, wherein the storage is to further store a stack used by the stack-based algorithm to store stack entries created for respective nodes in the hierarchical arrangement.

3. The computer of claim 1, wherein the processor is to further output a result of the keyword search based on the identified ELCA nodes.

4. The computer of claim 3, wherein the processor is to identify the ELCA nodes by:
   identifying candidate ELCA nodes; and
   determining whether the candidate ELCA nodes are actual ELCA nodes.

5. The computer of claim 3, wherein the result of the keyword search is a set of the identified ELCA nodes that contain at least one occurrence of all of the query keywords either in labels of the ELCA nodes or in the labels of the ELCA nodes' descendant nodes, after excluding occurrences of the keywords in the subtrees of the tree that already contain at least one occurrence of all the query keywords.

6. A method, executed by a computer, of performing a keyword search in data stored within a storage in a hierarchical arrangement of nodes representing Extensible Markup Language (XML) data; the method comprising:
   executing, by a processor in communication with said storage, a keyword search query containing query keywords to:
      identify sets of nodes in the hierarchical arrangement for respective query keywords;
      identify a smallest of the sets of nodes; and
      starting with the smallest of the sets of nodes, apply a stack-based algorithm to identify exclusive lowest common ancestor (ELCA) nodes of the hierarchical arrangement.

7. The method of claim 6, wherein said step of executing, by said processor, a keyword search query containing query keywords outputs a result of the keyword search based on the identified ELCA nodes.

8. The method of claim 7, wherein said step of executing, by said processor, a keyword search query containing query keywords identifies the ELCA nodes by:
   identifying candidate ELCA nodes; and
   determining whether the candidate ELCA nodes are actual ELCA nodes.

9. The method of claim 7, wherein the result of the keyword search is a set of the identified ELCA nodes that contain at least one occurrence of all of the query keywords either in labels of the ELCA nodes or in the labels of the ELCA nodes' descendant nodes, after excluding occurrences of the keywords in the subtrees of the tree that already contain at least one occurrence of all the query keywords.

10. An article comprising at least one non-transitory computer-readable storage medium containing instructions for causing a computer to executa a method for performing a keyword search in data stored within a storage in a hierarchical arrangement of nodes representing Extensible Markup Language (XML) data, the method comprising:
    executing, by a processor in communication with said storage, a keyword search query containing query keywords to:
       identify sets of nodes in the hierarchical arrangement for respective query keywords;
       identify a smallest of the sets of nodes; and
       starting with the smallest of the sets of nodes, apply a stack-based algorithm to identify exclusive lowest common ancestor (ELCA) nodes of the hierarchical arrangement.

11. The article of claim 10, wherein said step of executing, by said processor, a keyword search query containing query keywords outputs a result of the keyword search based on the identified ELCA nodes.

12. The computer of claim 11, wherein said step of executing, by said processor, a keyword search query containing query keywords identifies the ELCA nodes by:
    identifying candidate ELCA nodes; and
    determining whether the candidate ELCA nodes are actual ELCA nodes.

13. The article of claim 11, wherein the result of the keyword search is a set of the identified ELCA nodes that contain at least one occurrence of all of the query keywords either in labels of the ELCA nodes or in the labels of the ELCA nodes' descendant nodes, after excluding occurrences of the keywords in the subtrees of the tree that already contain at least one occurrence of all the query keywords.

* * * * *